Patented May 22, 1923.

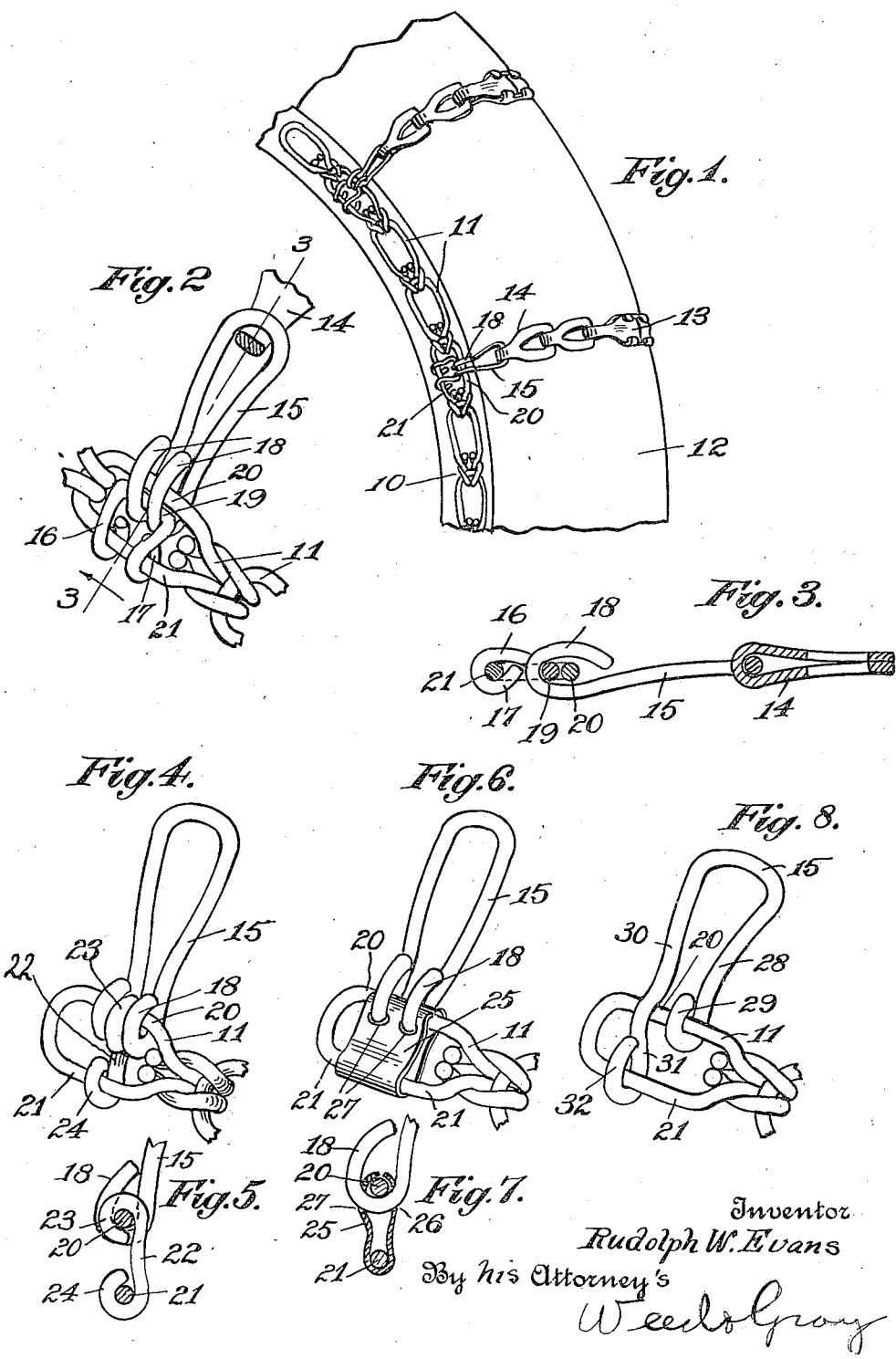

1,456,181

UNITED STATES PATENT OFFICE.

RUDOLPH W. EVANS, OF HAMILTON, ONTARIO, CANADA.

TIRE CHAIN.

Application filed October 27, 1921. Serial No. 510,762.

*To all whom it may concern:*

Be it known that I, RUDOLPH W. EVANS, a citizen of the United States, residing at Hamilton, Province of Ontario, and Dominion of Canada, have invented certain new and useful Improvements in Tire Chains, of which the following is a specification.

This invention relates to tire chains or anti-skid chains, an object thereof being to provide an improved means for connecting the cross chain with the side chains arranged at either side of the vehicle tire, the construction being such as to distribute substantially the entire pull or strain from the cross member or chain to the various parts of the connecting links of the side chains in such manner as to prevent the same from spreading and breaking.

As a result of this invention, an improved tire chain is provided, which will be more durable and serviceable in use and wherein the life and use of the same may be prolonged materially.

A further object of this invention is to provide an improved tire chain or anti-skid device having novel means for positively tending to prevent the turning of the cross chain when great strain is exerted thereon, particularly as may occur in cases wherein the vehicle skids and the pressure exerted upon the cross chain tends to turn the same over and cut into the tire.

Other objects of this invention will appear in the following description thereof, reference being had to the accompanying drawing forming a part of this specification, wherein like reference characters indicate corresponding parts in the several views and wherein Fig. 1 is a fragmentary perspective view of a tire illustrating a form of my invention as applied in connecting the cross chains and side chains. Fig. 2 is a perspective view in detail illustrating the embodiment shown in Fig. 1; Fig. 3 is a side view partly in section of the construction shown in Fig. 2; Fig. 4 is a detail perspective view of another embodiment of my invention; Fig. 5 is a detail side view partly in section, of the construction shown in Fig. 4; Fig. 6 is a detail perspective view of a further embodiment of my invention; Fig. 7 is a detail side view partly in section, of the construction shown in Fig. 6; and Fig. 8 is a detail perspective view illustrating a still further embodiment of my invention.

Heretofore in the construction of anti-skid chains, it has been the common practice in connecting the cross members which pass over the periphery of the tire, to the side chains, located at the sides of the tire, in such manner that a single side portion of each connecting link of the side chain will be subjected to the entire strain from the cross chain. This construction has been found disadvantageous by virtue of the fact that the connecting links tend to spread or pull apart and break when strain is placed upon the cross chain in use. As a result of the present invention, these disadvantages are eliminated, the essential feature thereof being to provide means for connecting the cross chain to the side chain whereby the connecting link of the side chain will not spread or be broken in use.

Referring particularly to Figs. 1, 2, and 3 wherein I have illustrated a preferred form of my invention, it will be seen that the anti-skid device comprises for example, a side chain 10 consisting of a plurality of articulated links 11 located at either side of the tire 12. The side chains 10 at opposite sides of the tire are connected at spaced intervals by means of the usual cross members or cross chains, which in preferred form, as illustrated in the present instance, comprise a center link 13, a plurality of side links 14 at either end thereof and end hooks or hooked links 15, all thereof suitably connected together in articulated manner.

As illustrated particularly in Fig. 2, the end link 15 is operatively connected to the opposed side portions 20 and 21 of the connecting link 11 by means of a link 16, which comprises a suitable looped portion 19, the ends thereof extending substantially in the same direction and being bent in such manner as to embrace the side portion 21. It will be observed that the looped portion 19 extends between the opposed sides 20 and 21 and that the link 15 at its ends 18 is bent so as to join and embrace both the side portion 20 and the loop portion 19 of the connecting link 16. Thus, it will be readily observed from this construction, that the strain exerted by the cross member will be distributed between the side portions 20 and 21 of the link 11 by means of the link 16 connecting such side portions together through the hooked or looped ends of the link 15.

Referring to Fig. 4, it will be seen that the end hook or link 15 of the cross member is provided with the usual bent hooked ends 18 embracing directly the side portion 20 of the link 11. In this embodiment however, I have shown a direct instead of an indirect connection between the side portions 20 and 21 of the link 11, which comprises a link 22 having a looped or hooked portion 23 embracing the side portion 20, the bent ends 18 of the link 15 being spaced to receive the link 22. At its opposite end this link is bent as at 24, thereby rigidly joining the side portions 20 and 21 of the side link.

In the embodiment illustrated in Fig. 6, the side parts 20 and 21 of the side link 11 are securely connected together by means of a link preferably formed from sheet metal and bent around the link in such manner as to form substantially a sleeve therefor. This link 25 at the opposed sides thereof is provided with registering apertures 26 and 27, through which the ends 18 of the end link 15 may be passed, and thereafter bent back as shown in Fig. 7.

In the embodiment illustrated in Fig. 8 I have illustrated a simple manner of transmitting or distributing the strain from the cross member to all of the main parts of the side link 11, thereby preventing the same from spreading and breaking. In this instance, the side member 28 is of the usual length and bent to embrace the side 20 of the link 11. On the other hand, the opposed side member 30 of this end link 15 is formed to extend beyond the end 29 between the side portions of the side link, the same being bent under and over the side 21 thereby connecting by a single integral structure the opposed sides of the side link 11.

It has been found in practice that the cross chains during use often have a tendency to turn over particularly when the vehicle skids, but I have found, by virtue of the present construction, that this tendency is considerably minimized. The present novel connections between the side portions of the side link and the end hooks or end links of the cross member restrict to a very material extent the capability of the end links to turn from a flat position. As a result of this novel construction therefore, herein shown in several preferred embodiments, a two-fold function is performed, namely, the prevention of the side connecting links from breaking and also the elimination to a considerable extent of the tendency of the cross members to turn from a flat position.

Furthermore, it will be preceived that I have provided an anti-skid device wherein the means of connection between the cross chain and the side chains has double the strength, durability, and life as in the case of devices heretofore constructed. Furthermore, in use, if the link 16, 22 or 25 should possibly break the end link 15 would still be connected to the side link 11 in the same manner as heretofore, and with equal strength and effectiveness as heretofore.

Although I have described my invention in its preferred form, it is to be understood that I do not limit myself to the construction herein shown and described, but may make any changes within the scope of the appended claims.

I claim as my invention:

1. An anti-skid device comprising a side link for a side chain, and an end link for a cross member, said end link operatively embracing a side portion of the side link and means embracing the companion side portion thereof for preventing the side portions of the side link from spreading, said means having connection to the opposite side portion through the medium only of said end link.

2. An anti-skid device comprising a side link for a side chain, and an end link for a cross member, and means formed independent of the side link for operatively connecting the end link to the opposed side portions of said side link, whereby the pull of the cross member will be so distributed as to resist the spreading of the side portions, said means extending and terminating between the side portions of one of said links.

3. An anti-skid device comprising a side link for a side chain, and an end link for a cross member connected together, said side link having independent connecting means between the side portions thereof constructed to resist the tendency of the side portions to spread, said means terminating entirely between the side portions of one of said links.

4. An anti-skid device comprising a side link for a side chain, and an end link for a cross member, said end link having a part thereof bent to receive a side portion of said side link, and means formed independent of the side link and located beyond said side portions for resisting the tendency of the cross member to turn during use.

5. An anti-skid device comprising a side link for a side chain and an end link for a cross member, said end link having a hooked end portion engaging one side of said side link, and a link engaging the opposed side of said side link and connected to said first mentioned side through the medium only of the link.

6. In an anti-skid device, a side link having opposed side portions, a connecting link located therebetween and embracing one side portion, and an end link for a cross member, said end link and other side portion being operatively interconnected, and said connecting link terminating entirely between the side portions of one of said other links.

7. In an anti-skid device, a side link having opposed side portions, a connecting link located therebetween and connected to one side portion, and an end link for a cross member, said end link operatively embracing both said other side portion and said connecting link, and the latter terminating entirely between the side portions of the side link.

8. An anti-skid device comprising a cross chain link a side chain link, a connecting link located between the sides of said side chain link and embracing one of said sides and also constructed to form a flexible connecting means, said cross chain link being bent to operatively interconnect therewith said other side and said connecting link.

9. An anti-skid device comprising a cross chain link, a side chain link, a connecting link located between the side portions of said side chain link, said connecting link having the free ends thereof bent to embrace the same side portion of said side chain link and having a loop portion juxtaposed to said other side portion, said cross chain link being bent to embrace both said loop portion and said last mentioned side portion.

10. An anti-skid device comprising a side chain and a cross member having an end link connected thereto, and means extending beyond said connection for resisting the tendency of said cross chain to turn during use, said means comprising a link connecting the end link and side chain.

11. An anti-skid device comprising a side chain having a side link and a cross member having an end link connected thereto and means for resisting the tendency of the cross chain to turn during use and comprising a link connecting a side portion of said side link with the end link.

12. An anti-skid device comprising a side chain and a cross chain, and means for connecting the same together, said means comprising a pair of articulated links bent to embrace each a side portion only of said side chain.

Signed at 1822 Park Row Building, New York, N. Y., this 20th day of October 1921.

RUDOLPH W. EVANS.